(12) United States Patent
Barkai et al.

(10) Patent No.: US 6,412,346 B2
(45) Date of Patent: Jul. 2, 2002

(54) COMPACT INERTIAL MEASUREMENT UNIT

(75) Inventors: Joseph Barkai, Raanana; Benjamin Hevroni, Yehud, both of (IL)

(73) Assignee: Israel Aircraft Industries Ltd., Lod (IL)

( * ) Notice: Subject to any disclaimer, the term of this patent is extended or adjusted under 35 U.S.C. 154(b) by 0 days.

(21) Appl. No.: 09/801,677

(22) Filed: Mar. 9, 2001

(30) Foreign Application Priority Data

Jul. 28, 2000 (IL) ................................................ 137572

(51) Int. Cl.$^7$ ................................................ G01P 1/02
(52) U.S. Cl. ......................................................... 73/493
(58) Field of Search ..................................... 73/493, 431

(56) References Cited

U.S. PATENT DOCUMENTS 5,579,110 A * 11/1996 Touchberry et al. ........ 356/350

* cited by examiner

*Primary Examiner*—Richard A. Moller
(74) *Attorney, Agent, or Firm*—Oliff & Berridge, PLC

(57) ABSTRACT

An inertial measurement unit mountable on a vehicle, comprising a housing accommodating three solid state sensor couples, each couple comprising a gyro member and an associated accelerometer. The housing is in the shape of a triangular pyramid, with a base fitted with true position and fixation arrangements for positioning and fixing the housing at a predetermined relation with respect to an axis of the vehicle. Each of the solid state sensor couples is fitted on a respective face of the housing.

17 Claims, 4 Drawing Sheets

COMPACT INERTIAL MEASUREMENT UNIT

FIELD OF THE INVENTION

The present invention is in the field of inertial measurement units of the type typically mounted on an a movable object, e.g. a marine vessel, a land vehicle or an airborne vehicle. In particular, the invention is concerned with a housing for such a unit.

The term "airborne vehicle" used herein in the specification and claims refers collectively to flying objects such as airplanes, missiles, rockets, etc. However, the invention is by no means restricted to any type of moving objects which are collectively referred to herein in the specification and claims as a "moving object".

BACKGROUND OF THE INVENTION

Inertial measurement units (IMU's) are commonly mounted on moving objects, e.g. an airborne vehicle for obtaining data regarding orientation of a flying object, namely, acceleration and rotation in three main axes (pitch, yaw and role) with respect to an axis of the flying object from which it is possible to derive information such as location, attitude, etc. An IMU is part of an inertial navigating system (INS) which comprises, among others, also a processor unit.

An IMU typically comprises a set of sensors for measuring acceleration and rotation along the three main axes. For that purpose, there are provided pairs of accelerometers for measuring acceleration, and gyros for measuring rotation. The gyros may be mechanical gyroscopes suitable for measuring rotation in two axes (in which case two such gyros will suffice) or, fiber optic gyros (FOG) which measure rotation only in one axis. Alternatively, the gyros may be ring laser gyros (RLG). Three gyros of the two latter types are required for measuring rotation in the three main axes, namely yaw, role and pitch of the moving vehicle. Such rotation sensors and accelerometers are collectively referred to as "solid state sensors".

The data received from the IMU is then transferred to a suitable processor wherein it is converted into useful navigating information for guiding and controlling the moving object, so as to follow a target or according to any moving protocol, e.g. flying, diving, etc.

In order to obtain precise data, it is required that the IMU be mounted onto the body of the moving vehicle at a fixed position with predetermined reference to an axis of the moving vehicle, typically a longitudinal axis thereof. The arrangement is such that the ratio between an axis of the moving vehicle and an axis of the IMU is known, whereby suitable calculations may be carried out for obtaining correction factors. For that purpose it is important that the housing of the IMU be fitted with true position and fixing arrangement, cooperating with corresponding means fitted on the moving vehicle, and suitable arrangements for fixing the IMU in that position. Thus, since the solid state sensors are fixedly received and articulated to the housing, their orientation (respective position with respect to an axis of the airborne vehicle) is calculable.

An evergrowing concern of moving vehicle designers and in particular of airborne vehicles is to reduce the size and weight of such vehicles wherein the volume per weight factor is of great importance and has direct influence on the overall payload which the airborne vehicle may carry. Still of importance is the projection of the IMU from the body of the airborne vehicle which influences the aerodynamic performances of the moving vehicle.

It is an object of the present invention to provide a housing for an IMU, fitted with solid state sensors for measuring acceleration and rotation about three main axes, and which is considerably compact in size, weight and volume and which is suitable for mounting on a moving object.

SUMMARY OF THE INVENTION

The main object of the present invention is to provide an inertial measurement unit (IMU) for a moving vehicle, fitted with a housing accommodating three solid state sensor couples, which has a significantly lower volume and weight as well as a low projection, as compared with known such platforms.

In accordance with the present invention there is provided an inertial measurement unit mountable on a moving vehicle, said system comprising a carrying a platform accommodating three solid state sensor couples, each couple comprising a gyro member for measuring rotation and an associated accelerometer for measuring acceleration about three main axes; said housing being in the shape of a triangular pyramid, with a base thereof fitted with true position and fixation means for positioning and fixing the housing at a predetermined relation with respect to an axis of the moving vehicle; and where each of said solid state sensor couple is fitted on a respective face of the housing.

By another aspect of the present invention there is to provided a housing for an inertial measurement unit, the housing being in the shape of a truncated triangular pyramid, and where each face thereof is fitted with a solid state sensor couple, each couple comprising a gyro member and an associated accelerometer.

By a specific embodiment of the invention, the pyramid-shaped housing is a truncated triangular pyramid with the solid state sensors mounted on respective faces of the housing for measuring acceleration and rotation about three main axes orthogonal to one another, fixed with respect to an axis of the moving vehicle, and where these axes coincide.

By one particular embodiment, the moving vehicle is an airborne vehicle.

BRIEF DESCRIPTION OF THE DRAWINGS

For better understanding the invention and to see how it may be carried out in practice, an embodiment will now be described, by way of non-limiting example only, with reference to the accompanying drawings, in which.

DETAILED DESCRIPTION OF AN EMBODIMENT

Figure 1:
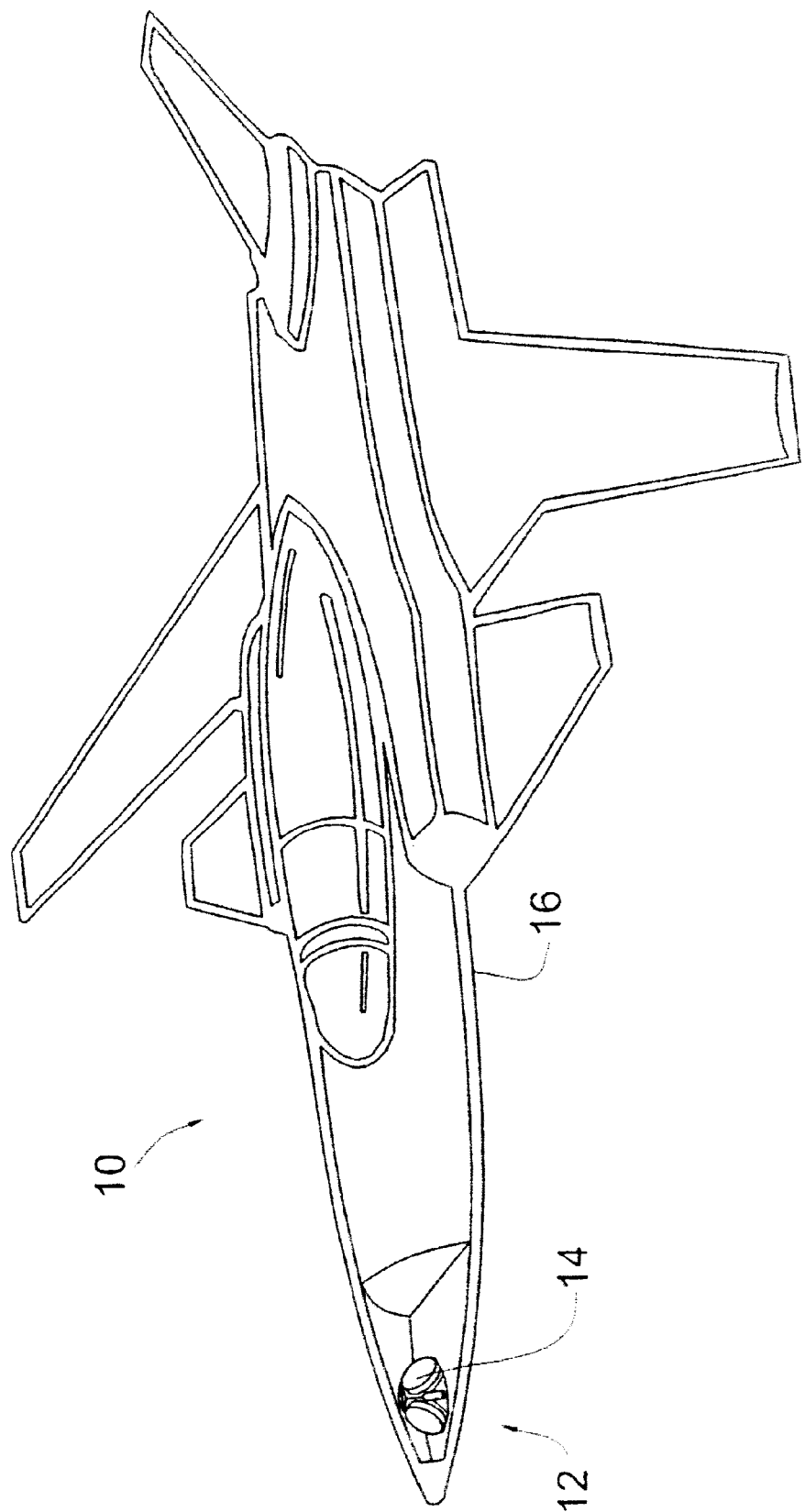
FIG. 1 is an isometric view of an aircraft fitted with an inertial measurement unit (IMU) in accordance with the present invention.

In FIG. 1 a moving object, namely an aircraft generally designated 10 is fitted within its nose with an inertial measurement unit (IMU) generally 12, fixedly attached to a suitable seating 14 on the missile's body 16.

Figure 2:
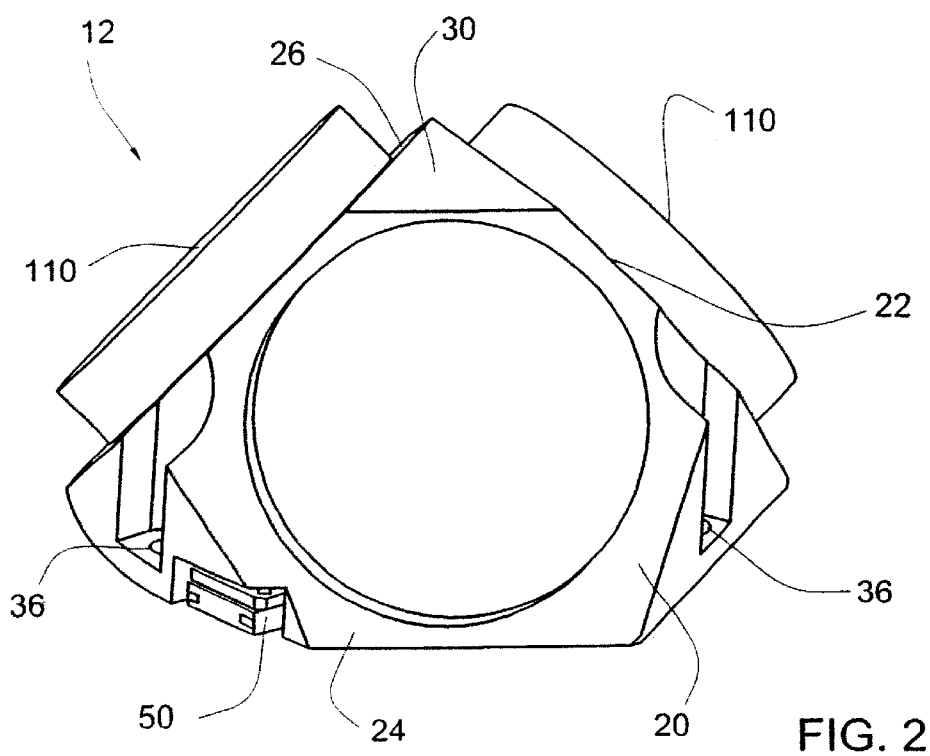
FIG. 2 is a top isometric view of the IMU according to the present invention.
Figure 3:
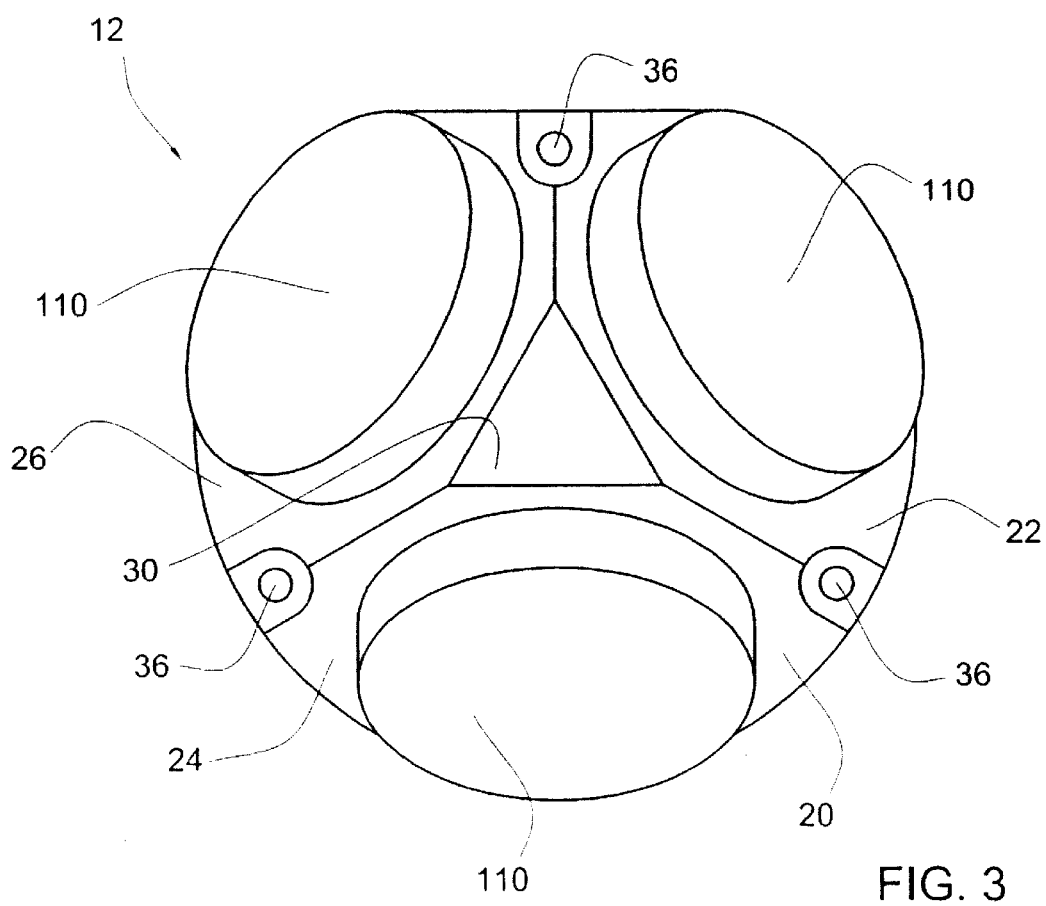
FIG. 3 is a top planar view of the IMU of FIG. 2.
Figure 4:
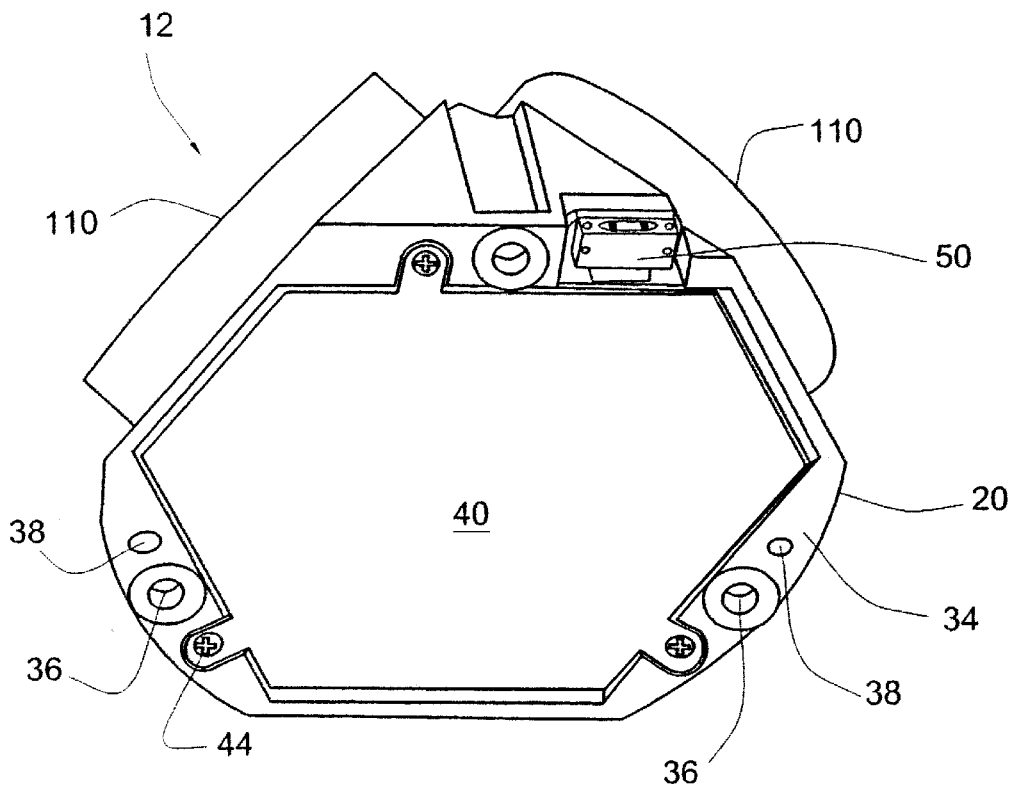
FIG. 4 is a bottom isometric view of the IMU seen in FIG. 2.

The IMU 12 seen in FIGS. 2 and 3 comprises a housing 20 which at times is referred to in the art as a chassis. The housing 20 is in the shape of a triangular pyramid having three faces 22, 24 and 26 orthogonally extending with respect to one another and having a truncated top portion 30 which is parallel to a bottom base 34 (FIGS. 4 and 6).

Base 34 (FIGS. 4 and 6) is adapted for fixedly attaching onto the seating 14 of the airborne vehicle by suitable bolts (not shown) extendible through holes 36. In order to position the IMU in a predetermined orientation with respect to a longitudinal axis of the aircraft 10, the base 34 is formed with two precisely formed bores 38 (FIGS. 4 and 6) for true position location over two corresponding pins (not shown) fitted on the seating 14.

A cover plate 40 (FIG. 4) covers a bottom opening of the housing 20 and is secured by several screws 44. Received within the housing adjacent cover plate 40, is an electric circuitry printed board (not shown) to which the electronic components are connected as known per se by a harness 54 (FIG. 7), and from which, at a bottom portion of the IMU there extends a connection socket 50 adapted for coupling with a suitable communication plug.

Figure 5:
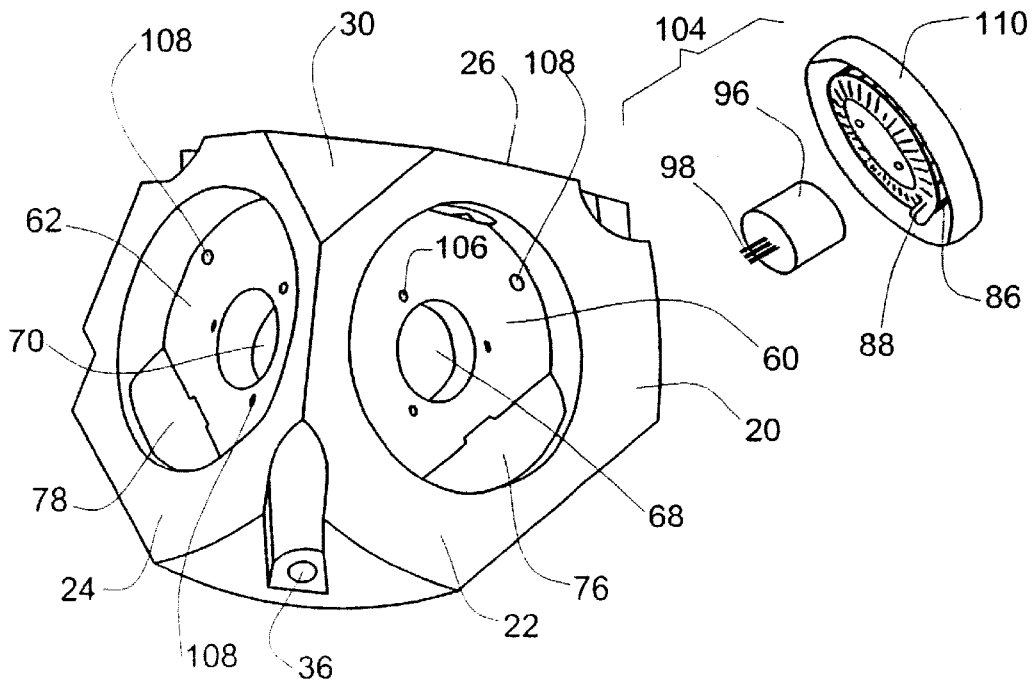
FIG. 5 is a housing used in the IMU of the present invention, with one couple of solid state sensors shown in exploded view.
Figure 6:
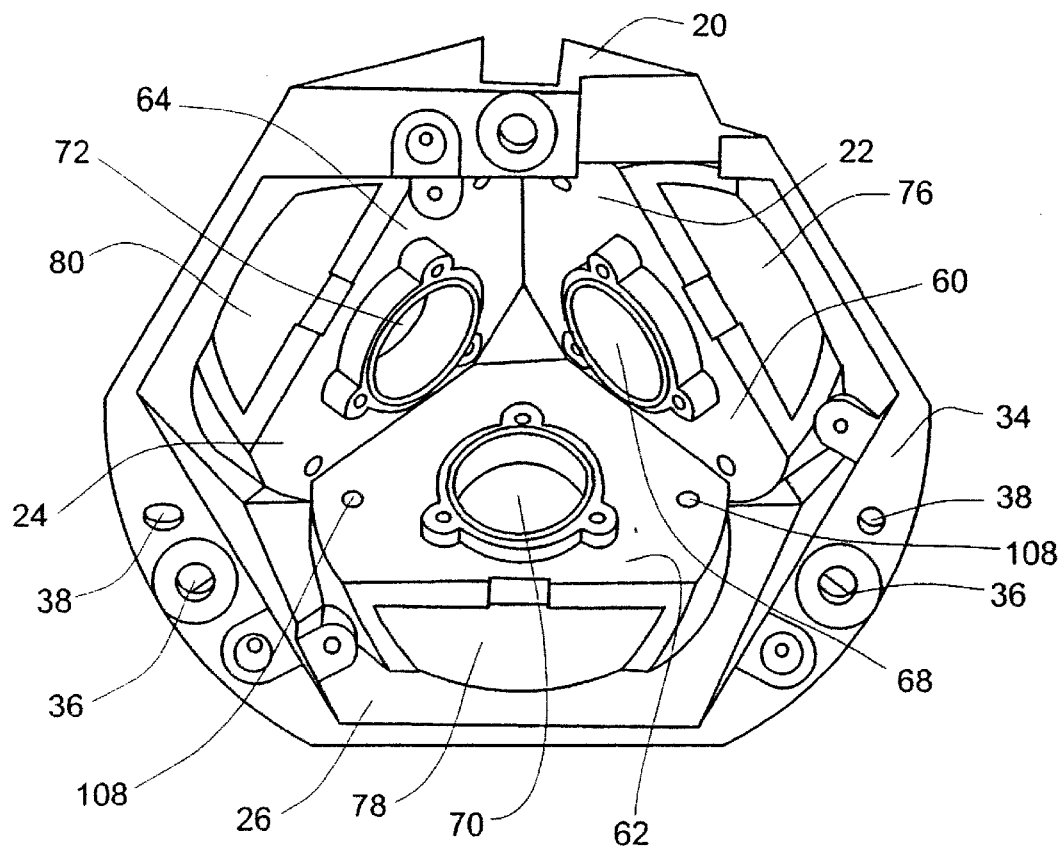
FIG. 6 is a bottom isometric view of the housing shown in FIG. 5.

As can be further seen in FIGS. 5 and 6, the housing 20 is formed at each of its faces 22, 24 and 26 with a cylindrical receptacle projecting inwardly from the surfaces of the housing, designated 60, 62 and 64, respectively. Each of the cylindrical receptacles is formed with a coaxial aperture 68, 70 and 72, respectively, and an inclined aperture 76, 78 and 80, respectively, formed by removing a wall portion of the cylindrical receptacles.

Figure 7:
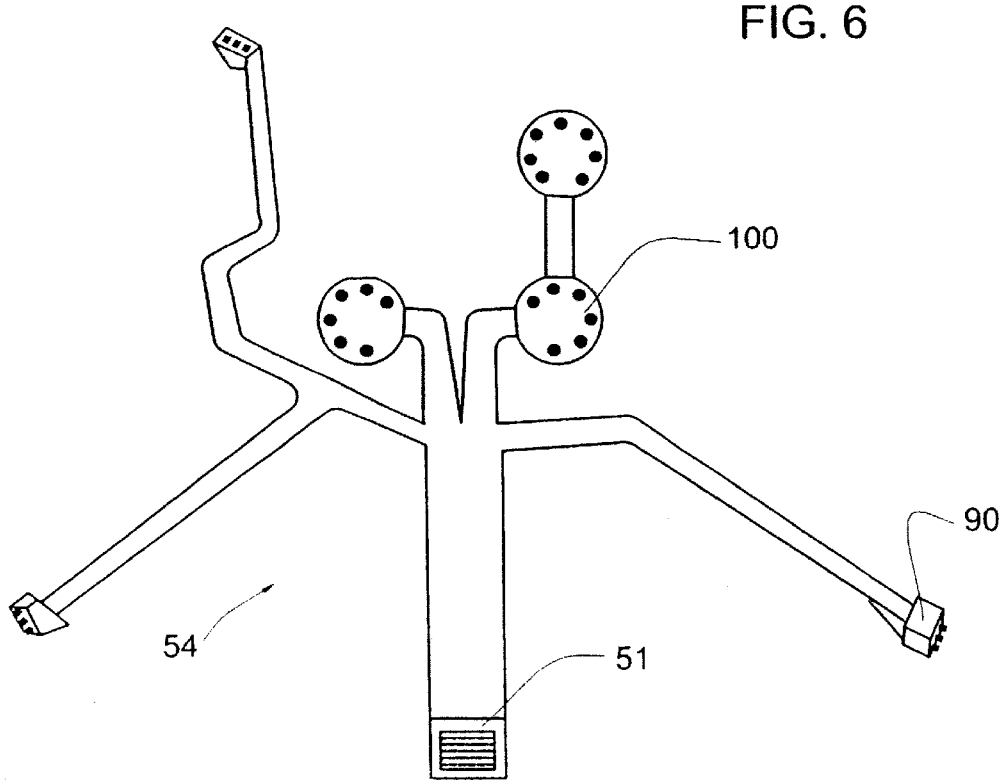
FIG. 7 is a harness used in an IMU in accordance with the present invention.

Cylindrical receptacle 60, 62 and 64 are fitted for snugly accommodating a gyro sensor 86 (FIG. 5) with a connector thereof 88 extending through the corresponding aperture 76, 78 and 80 into the cavity of the housing 20 for attaching thereto a respective socket 90 of harness 54 (FIG. 7). Each of the coaxial apertures 68, 70 and 72 accommodates an accelerometer 96 engageable by a plug 98 to a corresponding socket 100 on the harness 54 (FIG. 7). Each such couple of gyros 86 and accelerometer 96 is referred to as a solid state sensor couple 104. The accelerometers are secured to the housing by means of a suitable flange (not shown) fixed to the housing by screws via bores threaded 106. The gyros 86 are secured by suitable bolts extending through apertures 108 formed in the housing 20. Each of the gyros 86 is integrally fitted within a cover 110, which at the assembled state projects from the surfaces 22, 24 and 26, respectively of the housing 20. Harness 54 seen in FIG. 7 communicates between the three solid state sensor couples 104 and the printed circuit board (not shown), and for that purpose the harness is formed with three sockets 90 for connecting to three respective gyros 86, and three sockets 100 for connecting to a three respective accelerometers 96. The harness terminates at a connector 51 connectable to the printed circuit board the latter being formed with the externally accessible connection socket 50 for connecting to a processor means (not shown).

The design of the housing 20 is such that all three faces 20, 22 and 24 are orthogonal with respect to one another and the respective cylindrical receptacles 60, 62 and 64 and co-axial apertures 68, 70 and 72 extend along three octagonal axes which coincide below an apex of the pyramid.

It is desirable to maintain the weight and volume of the pyramid as low as possible in order to reduce the overall pay load of the airborne vehicle. It is also desirable that the overall height of the device be maintained as low as possible to reduce aerodynamic interference. In accordance with one preferred embodiment, the overall height of the device does not exceed about 54 mm with a volume of about 230 ccm.

Whilst a preferred embodiment has been described and illustrated with reference to the accompanied drawings, it is to be appreciated that variations therefrom are possible, without departing from the scope of the invention. For example, the true position bores 38 and fixing holes 36 may be differently designed. Still, rather than having cylindric covers 110 projecting from the surfaces 22, 24 and 26 of the housing 20, the cylindrical receptacle 60, 62 and 64, respectively, may be deeper for receiving the respective solid state sensor couples 104 such that covers of the gyros are flush with the surface of the housing 20.

Even more so, the invention has been exemplified with reference to an airborne vehicle. This however is a mere example and the IMU may be fitted to any type of moving vehicle, e.g. marine vessels, land vehicles, etc. and accordingly, the term "fly" and "flying" should be understood in the broad aspect of the invention, i.e. move/moving, respectively.

What is claimed is:

1. An inertial measurement unit mountable on a moving vehicle, said system comprising a housing accommodating three solid state sensor couples, each couple comprising a gyro member and an associated accelerometer; said housing being in the shape of a triangular pyramid, with a base thereof fitted with true position and fixation means for positioning and fixing the housing at a predetermined relation with respect to an axis of the vehicle; and where each of said solid state sensor couple is fitted on a respective face of the housing.

2. An inertial measurement unit according to claim 1, wherein the solid state sensor couples are mounted on receptive faces of the housing for measuring acceleration and rotation in three respective main axes orthogonal to one another, and wherein the axes coincide.

3. An inertial measurement unit according to claim 1, wherein the housing is in the shape of a truncated triangular pyramid.

4. An inertial measurement unit according to claim 1, wherein the solid state sensor couples are directly mounted on the housing.

5. An inertial measurement unit according to claim 1, wherein the gyros of the solid state sensor couples are fiber optic gyros (FOB) or ring laser gyros (RLG).

6. An inertial measurement unit according to claim 1, wherein each of the gyros is received within a cylindrical cover at a respective face of the housing, said platform being formed with suitable openings for passage of a wiring from each gyro into a confined space of the platform.

7. An inertial measurement unit according to claim 6, wherein the openings are formed at walls of the cylindrical housings.

8. An inertial measurement unit according to claim 6, wherein the cylindrical housings are covered with a cylindrical cover normally extending from a face of the platform.

9. An inertial measurement unit according to claim 1, wherein the fixation means is two or more apertures formed at the base of the housing, for securing to the moving vehicle by suitable fasteners.

10. An inertial measurement unit according to claim 9, wherein the aperturesare formed at respective edges of faces of the housing.

11. An inertial measurement unit according to claim 1, wherein one or more of the edges of the pyramid is truncated at a bottom portion thereof, adjacent the base of the housing.

12. An inertial measurement unit according to claim 1, wherein the gyros are integrally received within their cylindrical covers.

13. An inertial measurement unit according to claim 1, wherein the housing further accommodates a circuitry printed board extending adjacent a base of the housing and being electrically connected to the solid state sensor couples by a suitable harness; said circuitry printed board comprising an externally accessible socket.

14. An inertial measurement unit according to claim 1, wherein the moving vehicle is an airborne vehicle.

15. A housing for an inertial measurement unit, the housing being in the shape of a truncated triangular pyramid, and where each face thereof is fitted with a solid state sensor couple, each couple comprising a gyro member and an associated accelerometer.

16. A housing according to claim 15, wherein the solid state sensor couples are mounted on the housing with an essentially orthogonal relation between them, with the axes of the couples coinciding.

17. A housing according to claim 15, wherein a base of the pyramid is fitted with true position fixation means for positioning and fixing the housing at a predetermined calculable orientation with respect to an axis of a moving vehicle.

* * * * *